United States Patent

[11] 3,627,421

[72] Inventors John Harley
 355 Brooklyn Road;
 Johannes C. Deventer, 278 The Hillside,
 both of Pretoria, Republic of South Africa
[21] Appl. No. 821,740
[22] Filed May 5, 1969
[45] Patented Dec. 14, 1971

[54] READOUT SYSTEM FOR ANALYTICAL EQUIPMENT
16 Claims, 3 Drawing Figs.

[52] U.S. Cl. .................................................. 356/98,
 250/226, 320/1, 324/111, 356/86
[51] Int. Cl. ......................................................... G01j 3/30,
 G01j 3/28
[50] Field of Search .......................................... 356/81, 98,
 86, 85; 250/226; 320/1; 324/111

[56] References Cited
UNITED STATES PATENTS

| | | | | |
|---|---|---|---|---|
| 2,919,408 | 12/1959 | Brown | | 324/111 UX |
| 2,999,206 | 9/1961 | Stoddart et al. | | 324/111 X |
| 3,105,170 | 9/1963 | Palmer | | 320/1 X |
| 3,141,124 | 7/1964 | Atherton | | 320/1 |
| 3,227,038 | 1/1966 | Earle | | 356/81 |
| 3,298,275 | 1/1967 | Du Bois et al. | | 356/81 |

*Primary Examiner*—Ronald L. Wibert
*Assistant Examiner*—F. L. Evans
*Attorney*—Fraser and Bougucki

ABSTRACT: A direct reading emission spectrometer is disclosed in which the current generated by a light-sensitive transducer in each of a plurality of channels corresponding to the different wavelengths of light from a sample to be quantitatively analyzed is applied to charge a capacitor during a charging interval. The capacitor voltage is compared with a threshold value at the start of each of a succession of sampling intervals within the charging interval, and an increment of charge is removed from the capacitor simultaneously with the charging thereof by the generated current during each of those sampling intervals at the start of which the capacitor voltage is determined to be at least equal to the threshold value. Each charge removal is digitally recorded to provide a continuous indication of the integral of current flowing into the capacitor.

FIG.—1

INVENTORS
JOHN HARLEY
JOHANNES C. VAN DEVENTER
BY Fraser and Bogucki
ATTORNEYS

READOUT SYSTEM FOR ANALYTICAL EQUIPMENT

BACKGROUND OF THE INVENTION

1. Field of the Invention

The present invention relates to analytical scientific equipment readout systems, and more particularly to signal integration apparatus for spectrochemical equipment.

2. History of the Prior Art

Analytical scientific equipment such as the emission spectrometer has found widespread use in the quantitative or other evaluation of substances to be analyzed. Such equipment is frequently of the multichannel type in which each of a plurality of different channels corresponds to a different element in the specimen being analyzed. Multichannel analytical equipment may be of the direct reading type in which signals are simultaneously present at each of the channels, although other types in which, for example, signals appear sequentially at the different channels are not uncommon.

In a direct reading emission spectrometer the light emanating from an arc or spark struck between a known electrode and a sample to be quantitatively analyzed for its elements is directed onto an appropriate dispersion medium such as a diffraction grating or prism where it is separated into different wave lengths. The different wavelengths of light are sensed by different ones of a plurality of light-sensitive transducers such as photoelectric cells or photomultiplier tubes, each of which produces a current which is directly dependent upon the concentration of the particular element in the unknown sample being analyzed. The concentration of each element may be determined by integrating the current from the associated light-sensitive transducer over a fixed or known period of time.

One common technique for integrating the current generated in each channel of a spectrometer is to couple a capacitor in each channel such that it is charged by the current from the light-sensitive transducer. At the end of an integration interval the voltage across the capacitor is proportional to the integral of the current generated by the transducer. A quantitative measure of this voltage in digital form may be provided by appropriate means such as an analog-to-digital converter.

Such conventional integration techniques suffer from a number of serious limitations. In those arrangements where a capacitor in each channel is charged by current from a light sensitive transducer, the capacitor charges to a substantial voltage at the end of the integration interval thereby greatly increasing the leakage current and consequent nonlinear effects. The accuracy of such equipment is thus impaired unless expensive low-leakage capacitors are used. The conversion of capacitor voltage into equivalent digital values moreover, commences only after the end of the integration interval resulting in an unwanted delay. This is particularly significant in systems of the direct reading type where the simultaneously occurring signals in the different channels should ideally be integrated and converted to digital values simultaneously rather than sequentially as is done in many prior art systems. Such delays are serious as they prevent the equipment from being in continuous use on processes which are often very costly, and because losses in production through waiting for results, particularly when many samples are analyzed within a short period of time.

BRIEF SUMMARY OF THE INVENTION

In accordance with the present invention, a system is provided in which a signal representative of a parameter of a substance being analyzed is applied to charge a capacitor during a charging time interval. The level of charge on the capacitor is periodically sampled during the charging interval and an increment of charge is removed from the capacitor simultaneously with the charging thereof following each sampling which determines the charge level to be at least equal to a threshold value. Where plural signals are present, such signals are directed into different channels to charge associated capacitor, the incremental charges being removed from each of the capacitors independent of the activity in the other channels. Each removal of an increment of charge from a capacitor results in the generation of a digital representation thereof, the representations being processed such as by counting and storage in a memory to provide an indication of the total charge of the capacitor over the time period of integration. In this manner the total integration figure from each of the channels is available for immediate use in digital form. The periodic removal of charge in increments moreover avoids the necessity for using expensive, low-leakage capacitors and provides for more accurate measurement since the total capacitor voltage and resulting leakage are minimized during the entire charging interval.

In accordance with particular aspects of the invention the level of charge on the integrating capacitor at the end of each of a succession of sampling intervals occurring within the charging interval is measured such as by detecting the voltage drop thereacross. If the charge level is determined to be less than a predetermined threshold value, the capacitor is permitted to charge without simultaneous discharge during the next sampling interval. If the charge level is at least equal to the threshold value however, a fixed increment of charge is removed from the capacitor simultaneously with the charging thereof during the next sampling interval. The sampling and discharging process is repeated at the end of each sampling interval until the charging interval is terminated.

The sampling intervals which are defined by appropriate means such as a clock pulse generator are preferably of equal duration so as to provide uniformity of operation. The increments of charge removal moreover are preferably equal and have a value at least equal to the amount to which the capacitor may be charged during each sampling interval in order to minimize the total voltage which the capacitor may reach.

In one preferred arrangement of a readout system in accordance with the invention, a bistable device in the form of a field effect transistor biased to operate in its temperature-insensitive region responds to a capacitor voltage at least equal to the predetermined threshold value to generate an output signal via an associated differential amplifier. The true and complementary values of the output signal or the absence thereof are gated to different ones of a pair of AND gates coupled in toggle switch fashion upon the occurrence of each pulse from a clock pulse generator. If an output signal is present upon the occurrence of a clock pulse, the toggle coupled gates change the state of another bistable device in the form of a flip-flop to indicate that an increment of charge is being removed from the capacitor during that sampling interval. At the end of the interval the flip-flop is returned to its initial state or reset sending a bit signal to a counter or other appropriate means for keeping a running count of the incremental discharges.

Simultaneously with the changing of the flip-flop state due to the presence of an output signal upon clocking, the toggle coupled gates operate to bias a still further bistable device in the form of a transistor into nonconduction. The transistor which remains nonconducting during the sampling interval biases a unilateral conducting device in the form of a diode into conduction permitting a current to flow from an associated power supply into the capacitor in a direction to discharge the capacitor. The current is made relatively constant by placing a relatively large impedance in circuit between the diode and power source and by choosing a source of voltage which is considerably larger than the voltages to which the capacitor is typically charged. The capacitor continues to discharge until the occurrence of the next clock pulse which signifies that the sampling interval is terminated and an increment of charge has been removed. If an output signal from the field effect transistor and associated differential amplifier is present upon the occurrence of the new clock pulse, the nonconductive bias on the transistor is continued and the reset flip-flop is again set so as to indicate another incremental charge removal at the end of the interval.

If an output signal is not present upon the occurrence of the new clock pulse however, the transistor is biased into conduction to render the diode nonconductive and prevent discharge of the capacitor during that interval. At the same time the flip-flop remains reset to prevent an incremental discharge indication from being provided at the end of the interval.

BRIEF DESCRIPTION OF THE DRAWINGS

The foregoing and other objects, features and advantages of the invention will be apparent from the following more particular description of a preferred embodiment of the invention as illustrated in the accompanying drawings, in which.

DETAILED DESCRIPTION

Figure 1:
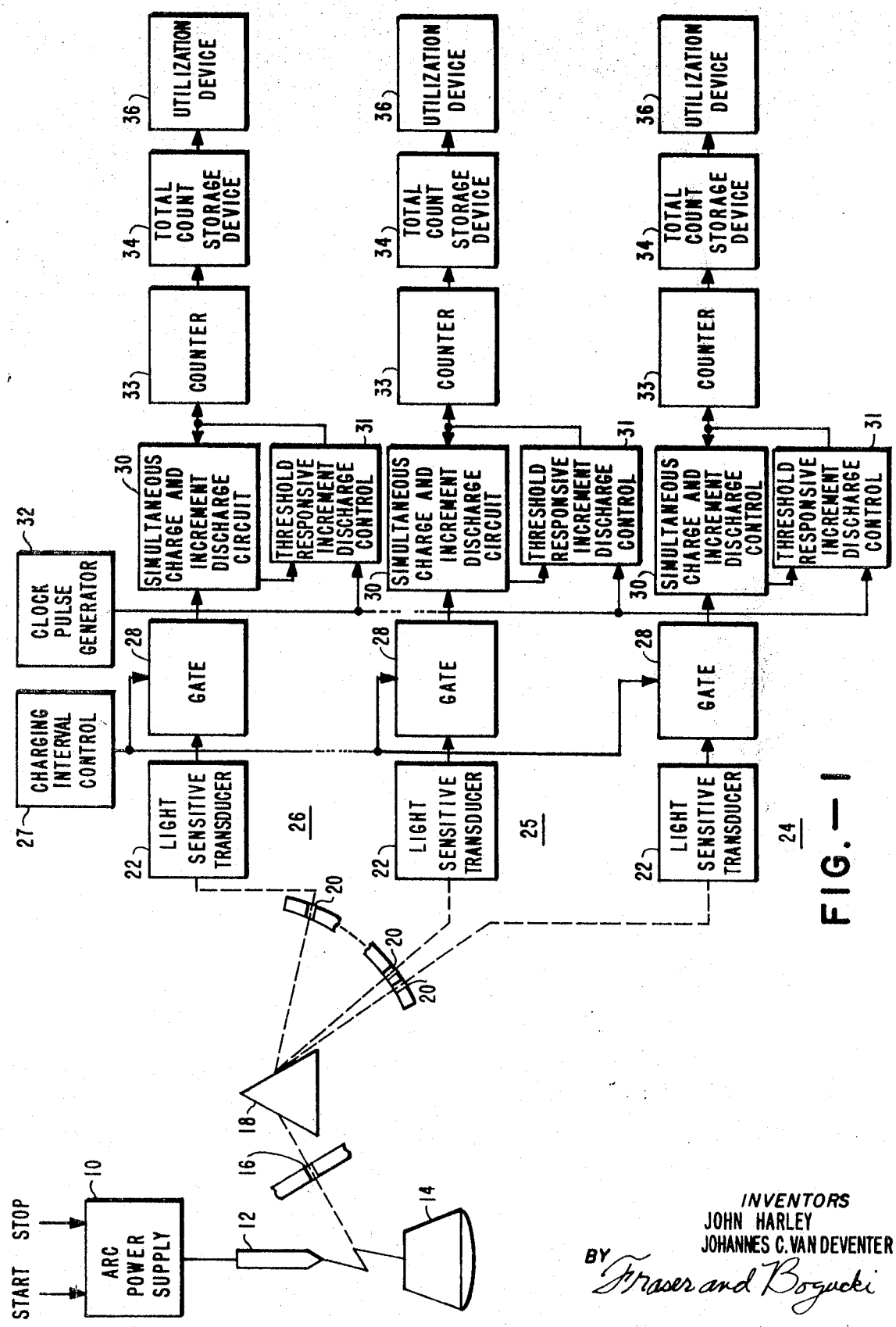
FIG. 1 is a generalized block and schematic diagram of a direct reading emission spectrometer having a readout system in accordance with the present invention.

The readout system of the present invention is conveniently illustrated in FIG. 1 and hereafter in connection with a direct reading emission spectrometer. It will be understood by those skilled in the art however that the spectrometer which is illustrated and hereafter described is presented by way of example only, and that the readout systems of the invention may be used with other forms of spectrometers and with other types of analytical equipment in which one or more capacitors are charged over a period of time by signals to represent a particular quantity or quantities being measured.

In the spectrometer illustrated in FIG. 1 analysis is begun by applying a start signal to an arc power supply 10 which is electrically coupled to an electrode 12 of known composition. This results in an electrical discharge in the form of a spark or arc between the known electrode 12 and a sample 14 to be quantitatively analyzed. Light emanating from the spark or arc is directed through an entrance slit 16 to a dispersion medium in the form of a prism 18 wherein the light is separated in accordance with the different wavelengths thereof. Each light ray of a different wavelength is directed through a different exit slit 20 to an associated light-sensitive transducer 22. The different light rays as dispersed by the prism 18 may comprise any appropriate number depending upon the nature of the sample 14 to be analyzed, only three such rays being illustrated in FIG. 1 for the sake of simplicity. Each light ray corresponds to a different element in the sample 14 being quantitatively analyzed, and the intensity of the individual light ray over a given period of time provides a direct indication of the quantity of the element present in the sample.

The light-sensitive transducers 22 which are included in different ones of three different readout channels 24, 25 and 26 may comprise photoelectric cells, photomultiplier tubes or other appropriate optical-electrical transducing devices. The transducers 22 generate electrical signals corresponding to the light intensity in each of the rays of different wavelengths. Accordingly, by integrating such signals over an integration interval or time period during which the sample 14 is being analyzed, analog representations are provided of the amounts of the different elements present in the sample 14. Such analog representations may then be converted into equivalent digital representation to be used as desired. Systems such as that illustrated in FIG. 1 are considered to be direct reading in the sense that the signals in each of the different channels 24, 25 and 26 are simultaneously generated by the light-sensitive transducers 22.

In typical prior art direct reading spectrometers, the signal generated by each of the light-sensitive transducers is applied to charge a capacitor, the capacitor voltage at the end of the charging interval providing an analog representation of each particular quantity to be measured. The resulting capacitor voltages in the different channels are then typically sequentially converted into the desired digital representations thereof such as by an analog-to-digital converter. As previously discussed such arrangements suffer from a number of serious limitations including considerable leakage from the capacitors due to the nonlinear high-voltage ranges to which they must typically be charged and the time delays incurred by converting the capacitor voltages into the desired digital representations only after the integration process is completed.

Such limitations are eliminated in accordance with the present invention by a readout arrangement in which the capacitors in the different channels are discharged in known increments during selected ones of a succession of sampling intervals simultaneously with the charging of the capacitors.

As shown in FIG. 1 a charging interval control 27 initiates a charging interval by opening gates 28 to pass the signal current from each of the light-sensitive transducers 22 to a simultaneous charge and increment discharge circuit 30. Each simultaneous charge and increment discharge circuit 30 includes a capacitor coupled to be charged by the signal current from the associated light-sensitive transducer 22 and the voltage drop across which is continuously monitored by an associated threshold responsive increment discharge control 31. A clock pulse generator 32 periodically generates a pulse to define the termination of one sampling interval and the commencement of the immediately following sampling interval. Upon the commencement of the first and each succeeding sampling interval by the clock pulse generator 32 the threshold-responsive increment discharge control 31 determines whether the voltage drop across the capacitor in the associated simultaneous charge and increment discharge circuit 30 is at least equal to a predetermined threshold value. If the capacitor voltage is at least equal to the threshold value a constant current discharge of the capacitor is initiated, said discharge occurring simultaneously with the charging of the capacitor by current from the associated light-sensitive transducer 22 during the remainder of the sampling interval. Upon occurrence of the next pulse from the clock pulse generator 32 defining the termination of the sampling interval and the commencement of the next sampling interval, the capacitor voltage is again examined by the threshold-responsive increment discharge control 31 to determine whether the voltage is at least equal to the threshold value. A capacitor voltage at least equal to the threshold value again results in the removal of an increment of charge from the capacitor during the sampling interval. If the capacitor voltage is determined to be less than the threshold value however, the capacitor continues to be charged by the current from the associated light-sensitive transducer 22 without any discharge during the remainder of the sampling interval.

At the end of each sampling interval during which an increment of charge is removed from the capacitor within the simultaneous charge and increment discharge circuit 30, the associated threshold-responsive increment discharge control 31 provides a digital bit signal to an associated counter 33. The counter 33 sums the digital bit signals as they occur to keep a running count of the bits via an associated total count storage device 34. Upon termination of the charging interval by the charging interval control 27 the storage devices 34 may be simultaneously interrogated, if desired, to provide digital representations of the quantities being measured to appropriate utilization devices 36.

Although each of the different channels 24, 25 and 26 in the FIG. 1 arrangement is illustrated as including a separate counter 33, total count storage device 34 and utilization device 36, it should be understood that other appropriate arrangements can be used in accordance with the invention. In many applications for example the use of separate counters and storage devices may prove to be too expensive or otherwise impractical. For such applications a single counting device can be timed shared by the different channels such as by providing operation in multiplexing or shift register fashion. Alternatively, a random access memory can be employed in combination with a single counter to provide the desired digital representations to a single or plural utilization devices 36 when required.

Figure 2:
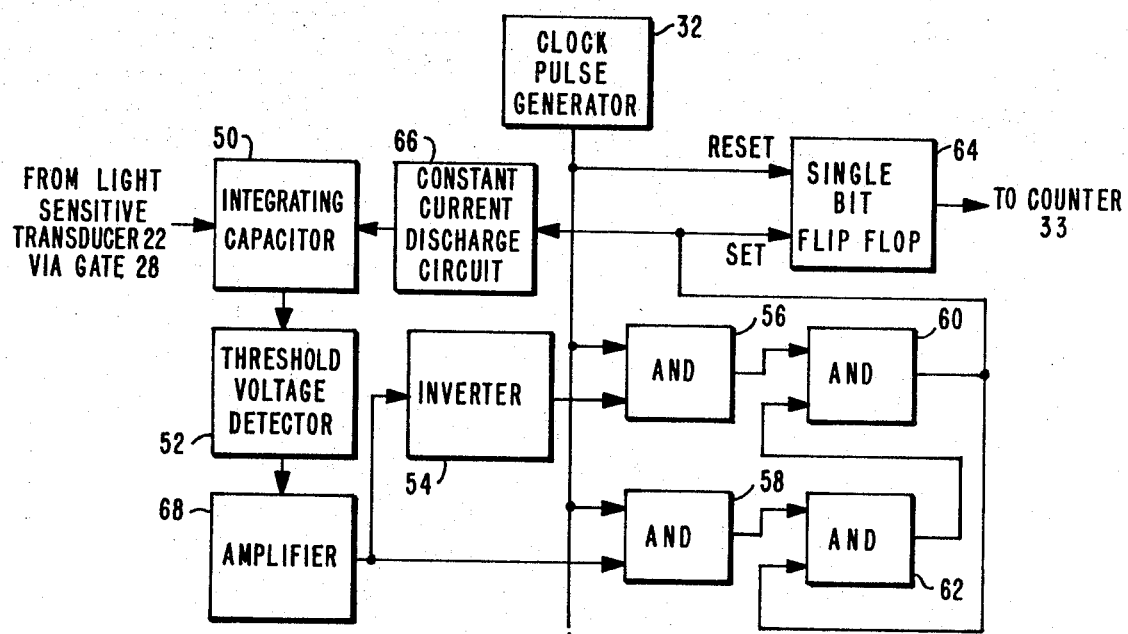
FIG. 2 is a more detailed block diagram of the readout system of the FIG. 1 arrangement.

One example of a simultaneous charge and increment discharge circuit 30 and associated threshold-responsive increment discharge control 31 in accordance with the invention is illustrated in block diagram form in FIG. 2. Current from the associated light-sensitive transducer 22 is applied to charge an integrating capacitor 50. The voltage drop across the capacitor 50 is continually monitored by a threshold voltage detector 52 which provides an output signal whenever the capacitor voltage drop is equal to or exceeds a predetermined threshold value. Otherwise no signal is present at the output of the detector 52.

With the voltage drop across the capacitor 50 less than the threshold value, the resulting absence of a signal at the output of the detector 52 appears at the input of an inverter 54 to generate a signal at the output thereof and enable one of the inputs of a first AND-gate 56. The detector 52 is also coupled to a second AND-gate 58 the associated input of which is not enabled when a signal is absent from the detector 52 output. Upon the occurrence of a pulse from the clock pulse generator 32 indicating that the present sampling interval is terminating and the next succeeding sampling interval is commencing the second input of each of the AND-gates 56 and 58 is enabled. With both inputs of the first AND-gate 56 enabled, a signal appears at the output thereof to enable one of the two inputs of a third AND-gate 60. Since only the clock input to the second AND-gate 58 is enabled, the output thereof which is coupled to one of the inputs of a fourth AND-gate 62 is absent an enabling signal. The second input of the fourth AND-gate 62 is coupled to the output of the third AND-gate 60, and the output of the fourth AND-gate 62 is coupled to the second input of the third AND-gate 60. The third and fourth AND-gates 60 and 62 therefore operate in toggle switch fashion, the output of one feeding of the inputs of the other and vice versa. The output of the third AND-gate 60 is also coupled to the SET input of a single bit flip-flop 64 and to the input of a constant current discharge circuit 66 which is coupled to the integrating capacitor 50.

With one of the inputs of the third AND-gate 60 enabled by the first AND-gate 56 indicating that no signal is present at the output of the detector 52, a no-signal condition is present at the output of the third AND-gate 60 and the flip-flop 64 and constant current discharge circuit 66 are unaffected. When the voltage drop across the capacitor 50 is at least equal to the predetermined threshold value however, the resulting signal at the output of the detector 52 is amplified by an amplifier 68 and applied to enable the associated one of the inputs of the second AND-gate 58. The same signal is applied to the input of the inverter 54 to disable the associated one of the inputs of the first AND-gate 56. Upon occurrence of a pulse from the clock pulse generator 32 a signal is provided at the output of the second AND-gate 58 to enable one of the inputs of the fourth AND-gate 62. By toggle action a signal is provided to set the flip-flop 64 and activate the constant current discharge circuit 66.

The constant current discharge circuit 66 applied a relatively constant current to the integrating capacitor 50 in a direction so as to tend to discharge the capacitor. The discharge current flows into the capacitor 50 simultaneously with the flow of charging current from the transducer 22 and removes an increment of charge from the capacitor during the particular sampling interval in question. Upon termination of the interval the clock pulse generator 32 resets the flip-flop 64 thereby transferring a bit signal representative of an increment of charge removal to the counter 33. If the voltage of the capacitor 50 is still at least equal to the threshold value upon occurrence of the clock pulse, an output signal is provided to again set the flip-flop 64 and activate the discharge circuit 66 to remove another increment of charge from the capacitor during the next sampling interval. If however the capacitor voltage has dropped below the threshold voltage upon occurrence of the clock pulse, no signal is present at the output of the third AND-gate 60. The flip-flop 64 accordingly remains in its reset state during the new sampling interval and the discharge circuit 66 is deactivated.

The process of detection of the capacitor voltage and removal of an increment of charge depending upon the value of the detected voltage is repeated for each clock pulse until the charging interval is terminated by the charging interval control 27 shown in FIG. 1.

It will be seen that by periodically removing increments of charge from the capacitor 50 simultaneously with the charging thereof during the integrating process the voltage to which the capacitor must be charged is limited and a continuous flow of digital representations of the charge removed from the capacitor is provided to the counter 33 for use whenever desired. Relatively inexpensive capacitors may therefor be used if desired, and the internal capacitor leakage, if any, is relatively constant and may be considered to be a part of the constant current discharge circuit 66. The sampling intervals as defined by the pulses from the clock pulse generator 32 and the increments of charge removed from the capacitor by the discharge circuit 66 are chosen to be equal for convenience and uniformity of operation, although neither the sampling intervals nor the quantities of discharge need be equal if so desired. The increments of charge removal provided by the discharge circuit 66 may be of any desired value, but are preferably at least equal to the amount by which the capacitor 50 may be charged by the current from the transducer 22 during the intervals. In this way the voltage of the capacitor 50 is limited in the sense that it cannot increase very much above the predetermined threshold value during the entire integration process. The capacitor voltage is also determined in part by the clock frequency, a higher frequency and the resulting shorter time intervals therefrom providing for a lower capacitor voltage, and vice versa.

Figure 3:
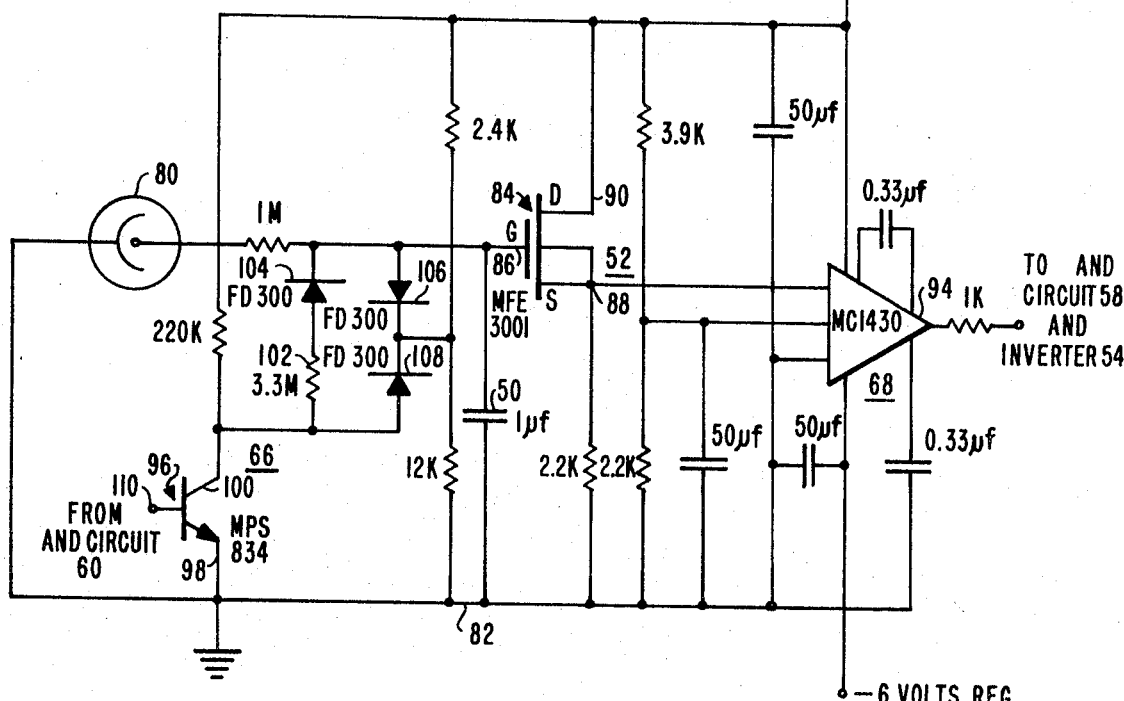
FIG. 3 is a schematic diagram of a portion of the arrangement illustrated in FIG. 2.

Preferred arrangements of the threshold voltage detector 52, the amplifier 68 and the constant current discharge circuit 66 are schematically illustrated in FIG. 3 in conjunction with the integrating capacitor 50 and a light-sensitive transducer 22 in the form of a photomultiplier tube 80. The gate 28 has been eliminated from FIG. 3 for reasons of clarity. The capacitor 50 is coupled between a ground bus 82 and one of the terminals of the photomultiplier tube 80, the other of which is coupled to the ground bus 82. The photomultiplier tube 80 responds to light of selected wavelength from the dispersing prism 18 shown in FIG. 1 to cause a current to flow along the ground bus 82 and into the capacitor 50 to charge the capacitor.

The threshold voltage detector 52 comprises a field effect transistor 84 the gate electrode 86 of which is coupled to one terminal of the capacitor 50 and the source terminal 88 of which is coupled to the other terminal of the capacitor 50. The drain terminal 90 of the field effect transistor 84 is coupled to the positive terminal 92 of a power supply. The transistor 84 is biased to operate in its temperature-insensitive region and has a relatively high input impedance so as not to affect the charge on the capacitor 50. When the voltage drop across the capacitor 50 is less than the predetermined threshold value the field effect transistor 84 remains nonconductive. When the capacitor voltage rises to a level equal to or greater than the threshold value however, the transistor 84 is biased into conduction to provide an output signal to the amplifier 68 which in this instance comprises a differential amplifier 94.

The constant current discharge circuit 66 comprises a transistor 96 the emitter electrode 98 of which is coupled to the ground bus 82 and the collector electrode 100 of which is coupled to the positive terminal 92 of the power supply. The collector electrode 100 is also coupled to the terminal of the capacitor 50 opposite the ground bus 82 through an impedance 102 and a diode 104, the diode being poled to conduct current in a direction from the positive power supply terminal 92 to the capacitor 50. A pair of diodes 106 and 108 which are coupled in parallel with the impedance 102 and diode 104 protect the field effect transistor 84 from over voltage and provide biasing when the field effect transistor is nonconductive.

If the voltage drop across the capacitor 50 is less than the threshold value upon the occurrence of a clock pulse, the resulting absence of a signal at the output of the differential amplifier 94 is sensed by the arrangement of AND-gates 56, 58, 60 and 62 shown in FIG. 2 to provide a positive voltage at the base terminal 110 of the transistor 96. This biases the transistor 96 into conduction lowering the voltage at the collector electrode 100 thereof. The lowered collector voltage biases the diode 104 into nonconduction to prevent current from the positive power supply terminal 92 from flowing through the diode 104 and into the capacitor 50. The transistor 96 and diode 104 respectively remain conductive and nonconductive during the remainder of the sampling interval enabling the capacitor 50 to be charged by current from the photomultiplier tube 80 without simultaneously discharge. If upon occurrence of the next clock pulse the voltage across the capacitor 50 is still less than the threshold value, the voltage at the base electrode 110 of the transistor 96 remains positive and the transistor 96 conducts during the next sampling interval to prevent discharge current from flowing through the diode 104 to the capacitor 50 in similar fashion.

When the voltage drop across the capacitor 50 is found to equal or exceed the threshold value upon the occurrence of a clock pulse, the arrangement of AND-gates 56, 58, 60 and 62 responds to provide a negative voltage to the base electrode 110 of the transistor 96 biasing the transistor into nonconduction. The voltage at the transistor collector electrode 110 rises to a value which is more positive than the voltage at the cathode of the diode 104, and current from the positive power supply terminal 92 flows through the impedance 102 and the diode 104 and into the capacitor 50 in a direction to discharge the capacitor during the sampling interval. If the voltage drop across the capacitor 50 continues to remain at least equal to the threshold value upon the occurrence of the next clock pulse, the transistor 96 remains nonconducting and another increment of charge is removed from the capacitor 50. Whenever the capacitor voltage drop falls below the threshold value however, the transistor 96 is again biased into conduction to prevent discharge of the capacitor 50 during that sampling interval in the manner previously described. The discharge current from the positive power supply terminal 92 is maintained relatively constant over the entire sampling interval in which an increment of charge is to be removed by the presence of the relatively large impedance 102 and by using a power supply voltage which is considerably larger than the voltages to which the capacitor 50 is typically charged.

Although there has been described a specific arrangement of a readout system for analytical equipment in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:

1. In an analytical system in which at least one signal is generated as a function of a particular parameter of a substance to be analyzed, readout means comprising:
   chargeable means coupled to be charged by the generated signal during a succession of sampling intervals within a charging interval;
   means for comparing the charge on the chargeable means with a predetermined threshold value upon commencement of each of the sampling intervals;
   means responsive to the comparing means for removing a fixed increment of charge from the chargeable means during each of the sampling intervals upon commencement of which the charge is determined to be at least equal to the threshold value; and
   means responsive to each removal of an increment of charge from the chargeable means for providing a digital representation thereof.

2. The combination defined in claim 1, further including means for summing the digital representations provided during said charging interval.

3. The combination defined in claim 1, wherein the sampling intervals are of substantially equal value.

4. The combination defined in claim 1, wherein the increments of charge removal are of substantially equal value.

5. The combination defined in claim 4, wherein each of the increments of charge removal is at least equal to the amount by which the chargeable means may be charged by the generated signal during each of the sampling intervals.

6. An analytical spectrometer for quantitatively analyzing different substances comprising:
   electrode means;
   means for providing an electrical discharge between the electrode means and a substance to be analyzed;
   means responsive to light emanating from the electrical discharge for dispersing the emanating light in accordance with the different wave lengths thereof; and
   a plurality of readout channels, each of which is responsive to dispersed light of a different wavelength for providing a digital representation thereof, and each of which includes means responsive to dispersed light of the selected wave length for the channel for generating a signal representative thereof; chargeable means coupled to be charged by the generated signal during a charging interval; means for removing a fixed amount of charge from the chargeable means simultaneously with the charging of the chargeable means during those ones of a succession of sampling intervals within the charging interval at the beginning of which the charge on the chargeable means is determined to be at least equal to a threshold value; and means responsive to the charge removing means for providing a signal representation of each charge removal.

7. The combination defined in claim 6, further including:
   means for generating periodic timing signals during the charging interval, said timing signals defining the sampling intervals; and wherein:
   the generated signal comprises a current the magnitude of which corresponds to the intensity of the light of selected wavelength;
   the chargeable means comprises a capacitor; and
   the charge removing means comprises means responsive to the level of charge on the capacitor for providing a signal indication whenever the charge on the capacitor is at least equal to the threshold value, and means responsive to each of the periodic timing signals and to the simultaneous presence of the signal indication for providing a substantially constant current discharge of the capacitor until the next succeeding timing signal is received.

8. The combination defined in claim 6, further including means responsive to the charge removal signal representations in each channel for providing an indication of the total number of representations provided by each channel during the charging interval.

9. The combination defined in claim 8, wherein the means for providing an indication of the total number of representations provided by each channel includes separate memory means in each of the different channels, each of the memory means being operative to store the charge removal signal representations in the associated channel during the charging interval.

10. In an analytical instrument having at least one capacitor coupled to be charged by a current representative of a quantitative parameter being measured, an arrangement for providing an output indication of the total charge on the capacitor over a given period of time comprising:
   means for sampling the level of charge on the capacitor at the beginning of each of a succession of sampling intervals within the given period of time to determine if the charge is at least equal to a predetermined value;
   means responsive to each sampling in which the capacitor charge is determined to be at least equal to the predetermined value for removing a fixed quantity of charge therefrom which is less than the total capacitor charge during the associated sampling interval simultaneously with the charging of the capacitor by said current; and means responsive to each removal of a fixed quantity of charge from the capacitor for providing a signal indication thereof.

11. The combination defined in claim 10, wherein the means for removing a fixed quantity of charge comprises a source of power, a unilateral conducting device coupled between the source of power and the capacitor and normally biased into nonconduction, and bistable means normally assuming one state and coupled to bias the unilateral conducting device into conduction when caused to assume another state by each determination that the capacitor charge is at least equal to the predetermined value, said unilateral conducting device applying a current from the source of power of the capacitor in a direction to tend to discharge the capacitor whenever said unilateral conducting device is biased into conduction.

12. The combination defined in claim 11, wherein:
the unilateral conducting device comprises a diode; and
the bistable means comprises a transistor which is normally conducting and is biased into nonconduction by each determination that the capacitor charge is at least equal to the predetermined value;
and further comprising an impedance coupled between the diode and the source of power, said impedance having a relatively large value and the voltage of the source of power being large relative to the voltages to which the capacitor is typically charged by the current representative of the quantitative parameter being measured to render the discharge current from the source of power to the capacitor relatively constant.

13. The combination defined in claim 11, wherein the sampling means comprises a second bistable means normally assuming one state and coupled to be biased into another state to provide an output signal by a voltage on the capacitor which is at least equal to the predetermined value, means for generating periodic timing signals, each of which defines the end of one sampling interval and the beginning of the immediately following sampling interval, and means responsive to the simultaneous presence of a periodic timing signal and an output signal from the second bistable means for biasing the first bistable means into said another state.

14. The combination defined in claim 13, wherein the second bistable means comprises a field effect transistor which is biased to operate in its temperature-insensitive range, and the sampling means further includes a differential amplifier coupled to the field effect transistor to provide the output signal whenever the field effect transistor conducts.

15. The combination defined in claim 13, wherein the means for generating periodic timing signals comprises a clock pulse generator, and the means responsive to the simultaneous presence comprises an inverter coupled to receive the output signals and provide the complement thereof at an output, a first AND-gate having an output and a pair of inputs which are respectively coupled to the inverter output and the clock pulse generator, a second AND-gate having an output and a pair of inputs which are respectively coupled to the clock pulse generator and to receive the output signal, and third and fourth AND-gates, each having a pair of inputs and an output, the inputs of the third AND-gate being respectively coupled to the outputs of the first and fourth AND gates, the inputs of the fourth AND gate being respectively coupled to the outputs of the second and third AND-gates, and the output of the third AND-gate being coupled to bias the first bistable means into said another state whenever a signal is present thereat.

16. The combination defined in claim 15, wherein the means responsive to each removal of a fixed quantity of charge from the capacitor for providing a signal indication thereof includes a flip-flop coupled to be switched into a first state whenever a signal is present at the output of the third AND gate and to be switched into a second state by each pulse from the clock pulse generator.

* * * * *

UNITED STATES PATENT OFFICE
CERTIFICATE OF CORRECTION

Patent No. 3,627,421         Dated December 14, 1971

Inventor(s) John Harley et al

It is certified that error appears in the above-identified patent and that said Letters Patent are hereby corrected as shown below:

Column 1, line 61, "because" should read --cause--.
Column 5, line 35, After "feeding" insert --one--; line 59, "applied" should read --applies--. Column 9, line 13, "of" (second occurrence) should read --to--.

Signed and sealed this 5th day of December 1972.

(SEAL)
Attest:

EDWARD M. FLETCHER, JR.
Attesting Officer

ROBERT GOTTSCHALK
Commissioner of Patents